(12) United States Patent
Skjonnemand et al.

(10) Patent No.: US 7,477,343 B2
(45) Date of Patent: Jan. 13, 2009

(54) NEGATIVE RETARDATION FILM

(75) Inventors: Karl Skjonnemand, Holburn (GB); Owain Llyr Parri, Poole (GB); Donald Gordon Graham, Corfe Mullen (GB); Tara Perrett, Bournemouth (GB)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 11/758,223

(22) Filed: Jun. 5, 2007

(65) Prior Publication Data

US 2007/0242190 A1  Oct. 18, 2007

Related U.S. Application Data

(63) Continuation of application No. 10/522,170, filed as application No. PCT/EP03/07532 on Jul. 11, 2003, now abandoned.

(30) Foreign Application Priority Data

Jul. 25, 2002 (EP) .................................. 02016332

(51) Int. Cl.
 *G02F 1/1335* (2006.01)
(52) U.S. Cl. ....................................... 349/102; 349/117
(58) Field of Classification Search ................. 349/102, 349/117
See application file for complete search history.

(56) References Cited

U.S. PATENT DOCUMENTS

| | | | | |
|---|---|---|---|---|
| 5,243,451 A * | 9/1993 | Kanemoto et al. | ............ | 349/75 |
| 5,827,449 A | 10/1998 | Hanelt et al. | | |
| 5,883,685 A * | 3/1999 | Mazaki et al. | ............... | 349/117 |
| 5,959,711 A * | 9/1999 | Silverstein et al. | .......... | 349/159 |
| 6,912,030 B1 * | 6/2005 | Coates et al. | ................ | 349/119 |
| 7,187,424 B2 * | 3/2007 | Parri et al. | ................... | 349/117 |

FOREIGN PATENT DOCUMENTS

WO  WO 0039631  7/2000

OTHER PUBLICATIONS

Bahadur, Liquid Crystals 1990, World Scientific, vol. 1, pp. 173-193.*

* cited by examiner

*Primary Examiner*—David Nelms
*Assistant Examiner*—David Y Chung
(74) *Attorney, Agent, or Firm*—Millen, White, Zelano & Branigan, P.C.

(57) ABSTRACT

The invention relates to a negative birefringent retardation film comprising polymerised liquid crystal (LC) material with helically twisted structure and planar orientation, its use in compensators and electrooptical displays like liquid crystal displays, and to compensators and liquid crystal displays comprising such a negative retardation film.

12 Claims, 3 Drawing Sheets

NEGATIVE RETARDATION FILM

This application is a continuation of U.S. application Ser. No. 10/522,170 filed Jan. 24, 2005 now abandoned claiming the benefit of European application serial no. 02016332.5 filed Jul. 25, 2002 and PCT application PCT/EP03/07532 filed Jul. 11, 2003, all of which are incorporated by reference herein.

FIELD OF THE INVENTION

The invention relates to a negative retardation film with improved performance, its use in displays and optical elements, and to optical elements and displays comprising such a film.

Definition of Terms

In connection with polarisation, compensation and retardation layers, films or plates as described in the present application, the following definitions of terms as used throughout this application are given.

The term 'film' as used in this application includes self-supporting, i.e. free-standing, films that show more or less pronounced mechanical stability and flexibility, as well as coatings or layers on a supporting substrate or between two substrates.

The term 'liquid crystal or mesogenic material' or 'liquid crystal or mesogenic compound' should denote materials or compounds comprising one or more rod-shaped, board-shaped or disk-shaped mesogenic groups, i.e. groups with the ability to induce liquid crystal phase behaviour. Liquid crystal compounds with rod-shaped or board-shaped groups are also known in the art as 'calamitic' liquid crystals. Liquid crystal compounds with a disk-shaped group are also known in the art as 'discotic' liquid crystals. The compounds or materials comprising mesogenic groups do not necessarily have to exhibit a liquid crystal phase themselves. It is also possible that they show liquid crystal phase behaviour only in mixtures with other compounds, or when the mesogenic compounds or materials, or the mixtures thereof, are polymerised.

For the sake of simplicity, the term 'liquid crystal material' is used hereinafter for both liquid crystal materials and mesogenic materials, and the term 'mesogen' is used for the mesogenic groups of the material.

The term 'director' is known in prior art and means the preferred orientation direction of the long molecular axes (in case of calamitic compounds) or short molecular axis (in case of discotic compounds) of the mesogens in a liquid crystal material.

The term 'planar structure' or 'planar orientation' refers to a film wherein the optical axis is substantially parallel to the film plane.

The term 'homeotropic structure' or 'homeotropic orientation' refers to a film wherein the optical axis is substantially perpendicular to the film plane, i.e. substantially parallel to the film normal.

The terms 'tilted structure' or 'tilted orientation' refers to a film wherein the optical axis is tilted at an angle θ between 0 and 90 degrees relative to the film plane.

The term 'splayed structure' or 'splayed orientation' means a tilted orientation as defined above, wherein the tilt angle additionally varies monotonuously in the range from 0 to 90°, preferably from a minimum to a maximum value, in a direction perpendicular to the film plane.

In planar, homeotropic and tilted optical films comprising uniaxially positive birefringent liquid crystal material with uniform orientation, the optical axis of the film is given by the director of the liquid crystal material.

The term 'helically twisted structure' relates to a film comprising one or more layers of liquid crystal material wherein the mesogens are oriented with their main molecular axis in a preferred direction within molecular sublayers, said preferred orientation direction in different sublayers being twisted at an angle φ around a helix axis. The term 'helically twisted structure with planar orientation' means a film with helically twisted structure as described above, wherein the helix axis is substantially perpendicular to the film plane, i.e. substantially parallel to the film normal.

The term 'A plate' refers to an optical retarder utilizing a layer of uniaxially birefringent material with its extraordinary axis oriented parallel to the plane of the layer, and its ordinary axis (also called 'a-axis') oriented perpendicular to the plane of the layer, i.e. parallel to the direction of normally incident light.

The term 'C plate' refers to an optical retarder utilizing a layer of a uniaxially birefringent material with its extraordinary axis (also called 'c-axis') perpendicular to the plane of the layer, i.e. parallel to the direction of normally incident light.

The term 'O plate' refers to an optical retarder utilizing a layer of a uniaxially birefringent material with its extraordinary axis oriented at an oblique angle with respect to the plane of the layer.

An A plate or C plate comprising optically uniaxial birefringent material with positive birefringence is also referred to as '+A/C plate' or 'positive A/C plate'. An A plate or C plate comprising a film of optically uniaxial birefringent material with negative birefringence is also referred to as '−AC plate' or 'negative A/C plate'.

A retardation film with positive or negative birefringence is also shortly referred to as 'positive' or 'negative' retardation film, respectively.

The Japanese term "mura" literally means unevenness. This term is widely used and known to the expert in the field of liquid crystal displays, and describes optical non-uniformities in liquid crystal displays or liquid crystal films (see for example "Automatic blemish detection in liquid crystal flat panel displays" by William K. Pratt et al., SPIE Proceedings 3306-01, pp. 2-13). Mura can be measured for example by an instrument of Eldim S A (Herouville Saint Clair, France) commercially available as MURATest®, which measures unevenness of luminance and colour.

BACKGROUND AND PRIOR ART

Retardation films with negative birefringence for use in liquid crystal displays (LCD) are known in prior art.

For example, in LCDs of the vertically aligned (VA) mode it is necessary to compensate light leakage that occurs in the dark state where the LC layer in the display cell is the non-selected, vertically aligned or homeotropic state. This can be achieved according to prior art by the use of a negative retardation film.

Compensated LCDs comprising a negative retardation film have been reported in prior art. For example, U.S. Pat. No. 6,141,075 discloses a VA-LCD comprising a positive and a negative retarder.

It is also known in prior art to use negative retarders comprising polymerised cholesteric LC (CLC) material that has a short helical pitch and as a result shows a Bragg reflection band in the UV range of light (UV-CLC). Such a UV-CLC layer retards visible light with negative C symmetry and thus can be used as an optical negative C retarder in the visible region of the spectrum. For example, WO 01/20393 and WO 01/20394 disclose a compensator comprising a positive and a negative retarder for use in an LCD of the VA- or the twisted nematic (TN) mode, wherein the negative retarder is for example made of polymerised UV-CLC material.

However in LC displays and LC films often the so-called "mura" effect is observed. For example, in case of a UV-CLC film, between crossed polarisers some areas of the UV-CLC films appear lighter than others, producing a speckled, non-uniform dark state. This can have a significant negative influence on the performance of UV-CLC films when used as compensator in LCDs.

The aim of the present invention is to provide a negative retarder in particular for use in LC displays that does not have the drawbacks of retardation films of prior art, shows reduced "mura" effect, is easy to manufacture and allows economic fabrication even at large scales.

Another aim is to provide a compensator comprising a negative retarder which shows good optical performance when used in LC displays, in particular improved grey level stability at wide viewing angles.

A further aim of this invention is to provide an advantageous use of a negative retarder according to this invention.

Further aims of this invention relate to liquid crystal displays, in particular to VA mode LCDs, comprising a retardation film according to the invention which show advantageous properties such as good contrast, reduced colour shift and wide viewing angles.

Other aims of the present invention are immediately evident to the person skilled in the art from the following detailed description.

The above aims can be achieved by providing retarders and liquid crystal displays according to the present invention.

The inventors of the present invention have found that by using a UV-CLC film with a reduced helical pitch, in particular with a pitch of 200 nm or less, as negative retarder the mura effect can be significantly reduced. Furthermore it was found that, in an LCD comprising at least one negative UV-CLC retarder, a liquid crystal cell and two linear polarisers, the mura effect can be reduced by specific arrangment of the UV-CLC film. If the UV-CLC film is positioned such that the director orientation at its surface facing the nearest polariser is close to 45° relative to the polarisation direction, the mura effect is minimised.

SUMMARY OF THE INVENTION

The present invention relates to a negative retardation film comprising polymerised liquid crystal (LC) material with helically twisted structure and planar orientation, wherein the helical pitch of the LC material is 200 nm or less.

The invention further relates to a combination of a negative retardation film comprising polymerised LC material with helically twisted structure and planar orientation and a linear polariser, wherein the director at the surface of said retardation film facing said polariser and the polarisation direction of said polariser are oriented at an angle of from 30 to 60° relative to each other.

The invention further relates to the use of a negative retardation film or a combination according to the invention in compensators and electrooptical displays like liquid crystal displays.

The invention further relates to a compensator or a liquid crystal display comprising a negative retardation film or a combination of a negative retardation film and a linear polariser according to the invention.

DETAILED DESCRIPTION OF THE INVENTION

The negative retardation film according to the present invention comprises helically twisted polymerised or crosslinked LC material with a short pitch. Preferably the negative retarder is a negative C plate retardation film comprising polymerised cholesteric LC (CLC) material with reflection in the UV range, which is also known as UV-CLC film or highly twisted A plate. UV-CLC films or highly twisted A plate films and their preparation are generally described for example in GB 2,315,072, WO 01/20393 and WO 01/20394.

In a UV-CLC film, by ensuring the CLC Bragg reflection of the film is entirely below visible wavelengths ($\lambda$<380 nm) the film exhibits zero on-axis retardation and therefore appears dark when placed between crossed polarisers. However, in UV-CLC films showing the mura effect, some areas of the films appear lighter than others, producing a speckled, non-uniform dark state. In the lighter areas of the mura the polarisation state of the light passing on-axis through the film is altered. As the film is not retarding, an alternative, spatially varying, effect is causing these variations.

According to a first preferred embodiment of the present invention the mura effect in a UV-CLC film is reduced by reducing the helical pitch of the film.

This first preferred embodiment relates to a negative birefringent retarder comprising polymerised CLC material wherein the helical pitch of the CLC material is 200 nm or less.

It was observed that within manufacturing tolerances the film thickness of a typical UV-CLC film prepared as described in prior art can vary in the order of about 2%.

Figure 1:
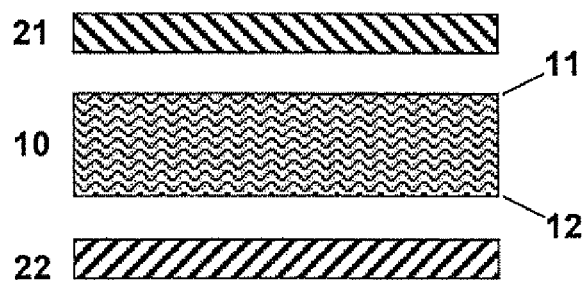
FIG. 1 schematically depicts a UV-CLC film provided between crossed polarisers.

Simulations using Berreman matrix methods have been performed to investigate the effect of variation of the film thickness of a UV-CLC film on its transmitted intensity when put into an assembly as exemplarily shown in FIG. 1. The assembly of FIG. 1 comprises a UV-CLC film (10) having an upper surface (11) and a lower surface (12) which is sandwiched between an upper linear polariser (21) and a lower linear polariser (22) having polarising axes that are perpendicular to each other. The simulations were carried out for UV-CLC films according to prior art and for UV-CLC films according to the present invention with reduced pitch values.

As a result it was found that there is a periodic variation in the transmitted light intensity with film thickness, which corresponds to the light and dark regions in the films. It was also found that the variation of the pitch of the CLC films has a surprisingly significant effect on the intensity of the light and dark regions of the mura.

To achieve good contrast in an LCD the transmission of the UV-CLC film between two crossed polarisers should preferably be minimised. From the above simulations it was found that the transmitted intensity of the UV-CLC film in both the light and dark regions is reduced by reducing the pitch. Furthermore, with reduced pitch the periodicity of the peaks is increased, so the number of light regions is increased for a given thickness variation. However, the reduced intensity in these light regions makes them less visible, lowers the level of mura and improves dark state and contrast.

The helical pitch of the CLC material in a negative retardation film according to the present invention is preferably from >50 nm to 200 nm, very preferably from 55 to 175 nm, most preferably from 55 to <100 nm.

Furthermore, in an assembly as exemplarily shown in FIG. 1, the orientation of the LC director at the upper surface (11) of a UV-CLC film (10) was calculated for various film thickness and pitch values. As a result, it was found that the transmission of the UV-CLC film is highest, when the LC director at the upper surface (11) is perpendicular to the LC director at the lower surface (12).

In a UV-CLC film according to the present invention the LC director at the upper surface (11) is preferably parallel or antiparallel, i.e. oriented at 180 or 360°, to the LC director at the lower surface (12).

The orientation of the upper and lower surface LC directors can be controlled by varying the pitch and/or the thickness of the UV-CLC film. The angle formed by the upper and lower surface LC directors is identical to the twist angle $\phi$ of the CLC material in the UV-CLC film, which is given by the helical pitch p of the CLC material and the film thickness d according to the equation $$\phi = 360° \cdot d/p$$

Thus, the pitch and film thickness of the UV-CLC film are preferably chosen such that the twist angle $\phi$ of the CLC material is a multiple of 180° or 360°.

According to a second preferred embodiment of the present invention the mura effect of a UV-CLC film can be reduced by proper arrangement of the film when it is placed between crossed polarisers or adjacent to a polariser. This is an especially suitable method for reducing mura in an UV-CLC film where the upper and lower surface LC directors are non-parallel.

This second preferred embodiment relates to a combination of a negative birefringent retarder comprising polymerised CLC material and a linear polariser, wherein the director at the surface of said retardation film facing said polariser and the polarisation direction of said polariser are oriented at an angle of approximately from 30 to 60° relative to each other.

Especially preferably the angle between the surface director of the UV-CLC film and the polarisation direction of the respective adjacent polariser is from 35 to 55°, in particular from 40 to 50°, very preferably 45°.

Through an optical microscope it was observed that if a UV-CLC film sandwiched between two linear polarisers is rotated relative to the polarisers, the light areas become dark and surprisingly the dark areas remain dark.

To verify that simulations are recreating the observed effect, calculations were performed for an assembly as exemplarily shown in FIG. 1 comprising a UV-CLC film (10) between crossed linear polarisers (21,22) which is rotated relative to the polarisers. As a result it was found that upon rotation of the CLC film, the mura effect generated by thickness variations is minimised and virtually disappears when the UV-CLC film is arranged such that the LC director at its lower surface (12) is oriented at 45° to the lower polariser (22).

The following embodiments of the present invention are preferred the negative retardation film comprises a polymerised or crosslinked chiral nematic or cholesteric LC material, the helical pitch of the CLC material in the negative retardation film is from >50 nm to 200 nm, very preferably from 55 to 175 nm, most preferably from 55 to <100 nm, the thickness of the negative retardation film is from 1 to 4 µm, preferably from 2 to 3.5 µm, the optical retardation of the negative retardation film is from 50 to 400 nm, preferably from 100 to 250 nm, An LCD comprising a negative retardation film as described above an below is another aspect of the invention. Especially preferred is an LCD comprising the following components a liquid crystal (LC) cell formed by two transparent substrates having surfaces which oppose each other, an electrode layer provided on the inside of at least one of said two transparent substrates and optionally superposed with an alignment layer, and an LC medium which is present between the two transparent substrates that is switchable between at least two different states by application of an electric field, a first linear polariser on one side of the LC cell, a second linear polariser on the side of the LC cell opposite to that of said first linear polariser, one or more negative retardation films situated between the LC cell and the first polariser and/or between the LC cell and the second polariser, it being possible for the above components to be separated, stacked, mounted on top of each other, coated on top of each other or connected by means of adhesive layers, wherein at least one of said negative retardation films is a film according to the present invention and/or a film that is arranged relative to the polarisers as described above and below.

Very preferred is an LCD, wherein the switchable LC medium exhibits a negative dielectric anisotropy and the LC molecules of the switchable liquid crystal medium exhibit a substantially homeotropic orientation when no electric field is applied.

Very preferably the LCD is a display of the vertically aligned (VA), multidomain VA (MVA) or patterned VA (PVA) mode. Displays of these types are generally known in the art.

The individual optical components of the LCD according to the invention, such as the LC cell, the individual retarders and the linear polarisers, can be separated or can be laminated to other components. They can be stacked, mounted on top of each other or be connected e.g. by means of adhesive layers. In case of films comprising polymerised LC material, it is also possible that stacks of two or more films are prepared by coating the LC material of one film directly onto another film, the latter serving as substrate.

The LCDs according to the present invention may further comprise one or more further optical components such as polarisers or compensation or retardation films, like for example a planar A plate, an O plate or a positive or negative C plate retardation film with twisted, homeotropic, planar, tilted or splayed structure. Particularly preferred are optical films comprising polymerised or crosslinked LC material. Tilted or splayed LC films are described for example in U.S.

Pat. No. 5,619,352, WO 97/44409, WO 97/44702, WO 97/44703 and WO 98/12584. Homeotropic LC films are described for example in WO 98/00475. Planar LC films are described for example in WO 98/04651.

The LCD according to the present invention may be a reflective or transmissive display, and may further comprise a light source, like a conventional backlight, or a reflective layer on the side of the LC cell opposite to that of the first linear polariser. In case of a reflective display with a reflective layer on one side of the LC cell the second linear polariser may be omitted.

The negative retarder of the present invention is preferably prepared from a polymerisable LC material by in-situ polymerisation. In a preferred method of preparation the polymerisable LC material is coated onto a substrate, oriented into the desired orientation and subsequently polymerised for example by exposure to heat or actinic radiation as described for example in WO 01-20394, GB 2,315,072 or WO 98/04651. In case of a UVCLC film the polymerisable LC material preferably comprises one or more achiral polymerisable mesogenic compounds and at least one chiral compound. The chiral compound can be selected from non-polymerisable chiral compounds, like e.g. conventional chiral dopants, polymerisable chiral non-mesogenic or polymerisable chiral mesogenic compounds.

In general, the polymerisable LC material preferably comprises at least one polymerisable mesogen having one polymerisable functional group (monoreactive compound) and at least one polymerisable mesogen having two or more polymerisable functional groups (di- or multireactive compound).

Alternatively it is possible to prepare the retardation film from a readily synthesized LC polymer that is applied onto a substrate, for example at a temperature above its glass transition temperature or its melting point, or from solution e.g. in an organic solvent, aligned into the desired orientation, and solidified e.g. by evaporating the solvent or by cooling below the glass temperature or melting point of the LC polymer. If for example a LC polymer with a glass temperature that is higher than ambient temperature is used, evaporation of the solvent or cooling leaves a solid LC polymer film. If for example an LC polymer with a high melting point is used, the LC polymer can be applied as a melt onto the substrate which solidifies upon cooling. LC side chain polymers or LC main chain polymers can be used, preferably LC side chain polymers. The LC polymer should preferably be selected such that its glass transition or melting temperature is significantly higher than the operating temperature of the retarder. For example, LC side chain polymers comprising a polyacrylate, polymethacrylate, polysiloxane, polystyrene or epoxide backbone with laterally attached mesogenic side chains can be used. The LC polymer may also comprise side chains with reactive groups that can be crosslinked after or during evaporation of the solvent to permanently fix the orientation. The LC polymer may also be subjected to mechanical or heat treatment after application to the substrate to improve alignment. The above methods and suitable materials are known to those skilled in the art.

The negative retarder according to the present invention can be used for compensation of conventional LCDs, in particular those of the DAP (deformation of aligned phases) or VA (vertically aligned) mode, like e.g. ECB (electrically controlled birefringence), CSH (colour super homeotropic), VAN or VAC (vertically aligned nematic or cholesteric) displays, MVA (multi-domain vertically aligned) or PVA (patterned vertically aligned) displays, in displays of the bend mode or hybrid type displays, like e.g. OCB (optically compensated bend cell or optically compensated birefringence), R-OCB (reflective OCB), HAN (hybrid aligned nematic) or pi-cell (π-cell) displays, furthermore in displays of the TN (twisted nematic), HTN (highly twisted nematic) or STN (super twisted nematic) mode, in AMD-TN (active matrix driven TN) displays, or in displays of the IPS (in plane switching) mode which are also known as 'super TFT' displays.

Especially preferred are VA, MVA, PVA, OCB and pi-cell displays.

The examples below serve to illustrate the invention without limiting it.

EXAMPLE 1

Negative UV-CLC Retarder with Reduced Pitch

Simulations using Berreman matrix methods have been performed to investigate the effect of the film thickness variation of various UV-CLC films on the transmitted intensity of the UV-CLCs film between crossed polarisers.

The simulations were carried out for an assembly as shown in FIG. 1, comprising a UV-CLC film (10) having an upper surface (11) and a lower surface (12) which is sandwiched between an upper linear polariser (21) and a lower linear polariser (22) having polarising axes that are perpendicular to each other.

The simulations were carried out for UV-CLC films (a)-(d) according to the present invention with a helical pitch of 140 nm (a), 160 nm (b), 180 nm (c) and 200 nm (d), respectively, in comparison with negative UV-CLC films (e)-(f) of prior art with a helical pitch of 220 nm (e) and 240 nm (f), respectively, and with an isotropic film (g). The films and their pitch values are shown in the table below.

| | Film | | | | | | |
|---|---|---|---|---|---|---|---|
| | a | b | c | d | e | F | g |
| Pitch (nm) | 140 | 160 | 180 | 200 | 220 | 240 | isotropic |

Figure 2:
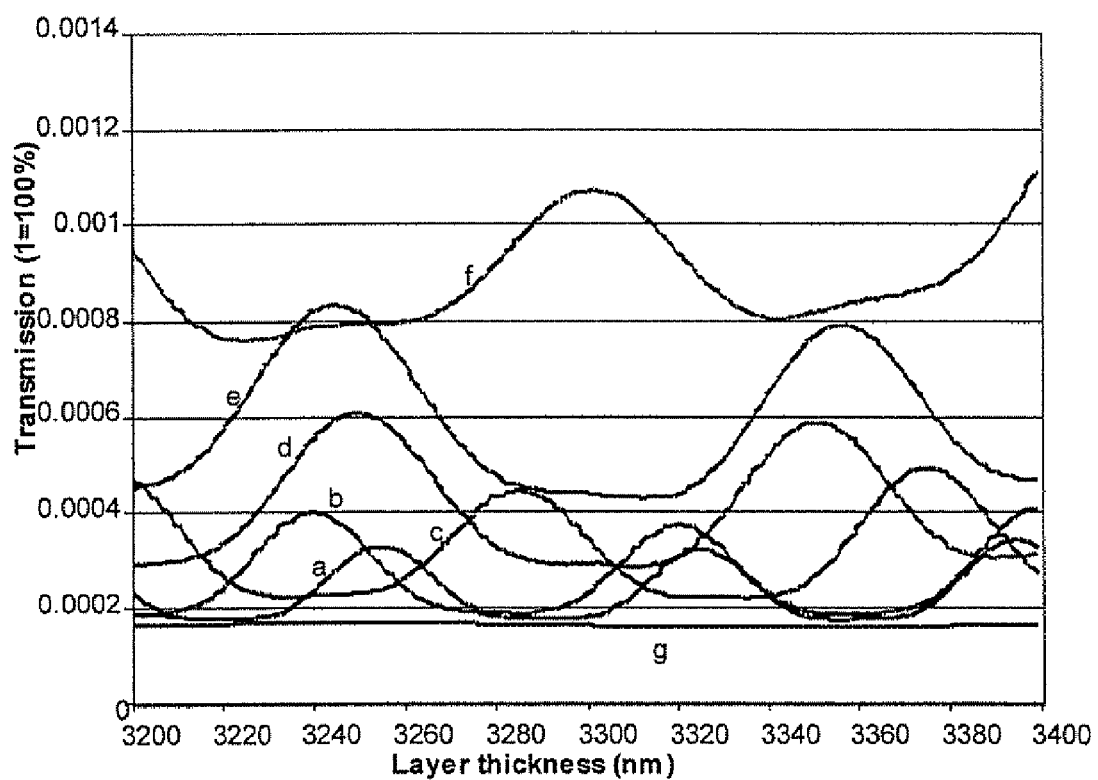
FIG. 2 shows the transmission of UV-CLC films of prior art and of the present invention between crossed polarisers with varied film thickness for different pitch lengths.

The results of the simulations are shown in FIG. 2, which depicts the intensity/thickness profiles for UV-CLC films (a)-(g).

FIG. 2 demonstrates that there is a periodic variation in the transmitted light intensity with film thickness, which corresponds to the light and dark regions in the UV-CLC films. It can also be seen that the variation of the pitch of the UV-CLC films has a surprisingly significant effect on the intensity of the light and dark regions of the mura.

From FIG. 2 it is evident that by reducing the pitch of a UV-CLC film the transmitted intensity in both the light and dark regions is reduced. The periodicity of the peaks is increased with reduced pitch so the number of light regions is increased for a given thickness variation. However, the reduced intensity in these light regions makes them less visible, lowers the level of mura and improves dark state and contrast. The UV-CLC films (a)-(d) with reduced pitch according to the present invention are therefore especially suitable for use as negative retarders.

EXAMPLE 2

Orientation of Negative UV-CLC Retarder Relative to Polarisers

By using the data from Example 1 as shown in FIG. 2, the orientation of the LC director at the upper surface of UV-CLC films (a)-(d) according to the present invention and UV-CLC films (e)-(f) of prior art was calculated for each film thickness and cholesteric pitch in an assembly as exemplarily shown in FIG. 1.

Figure 3:
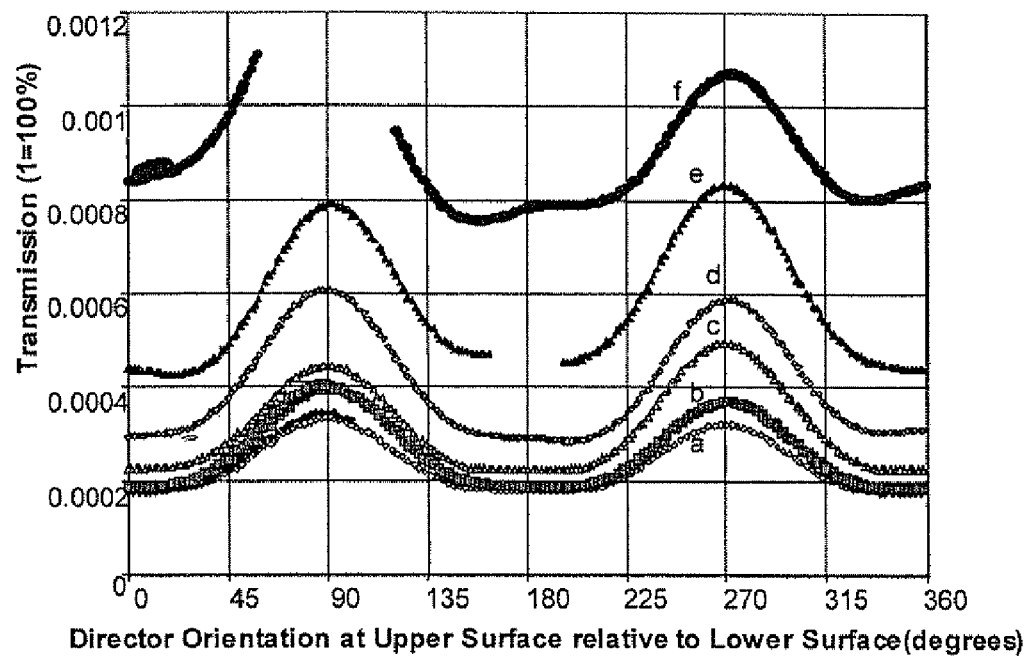
FIG. 3 shows the transmission of UV-CLC films of prior art and of the present invention between crossed polarisers versus director orientation at the upper surface.

The results are shown in FIG. 3, which depicts the transmission of the UV-CLC films (a)-(f) (10) versus the LC director orientation at the upper surface (11) relative to the LC director orientation at the lower surface (12). The director at the lower surface (12) is parallel to the polariser direction of the lower polariser (22). It is clearly seen that the intensity peaks occur when the upper surface LC director is perpendicular to the lower surface LC director.

When observing the UV-CLC films (a)-(f) through an optical microscope it can be seen that if the films are rotated relative to the polarisers, the light areas become dark and surprisingly the dark areas remain dark.

To verify that the simulations are recreating the observed effect, calculations were performed for the UV-CLC films (a)-(f) of example 1 when placed between two crossed linear polarisers in an assembly as exemplarily shown in FIG. 1. The results are depicted in FIG. 4 for UV-CLC film (a) according to the present invention with a pitch of 140 nm, and UV-CLC film (e) of prior art with a pitch of 220 nm, wherein the LC director at the lower surface (12) is aligned at 45° (a45, e45) and 0° (a0, e0), respectively, relative to the polarisation direction of the lower polariser (22).

Figure 4:
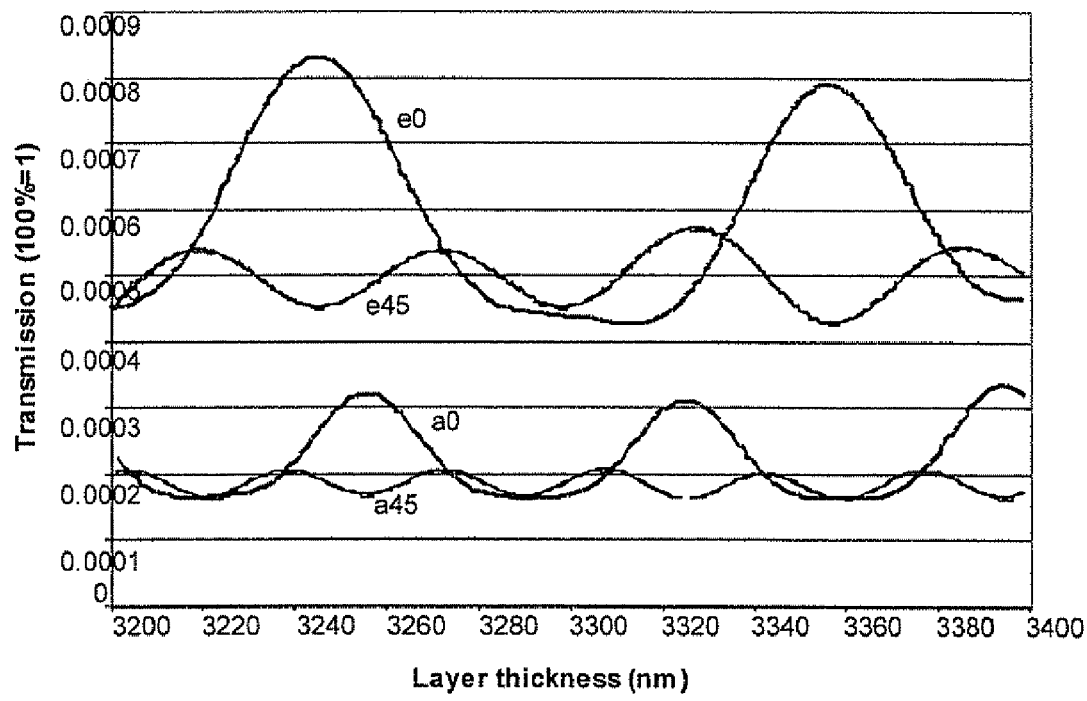
FIG. 4 shows the transmission of UV-CLC films of prior art and of the present invention between crossed polarisers with varied film thickness for different director orientations at the upper surface.

FIG. 4 clearly shows that upon rotation of the sample, the mura effect generated by thickness variations virtually disappears when the UV-CLC film is placed with the lower surface director 45° to the lower polariser. Therefore, lamination of a UV-CLC film according to the present invention with the lower surface director at an angle of 45° to the lower polariser will reduce the mura.

Figure 5:
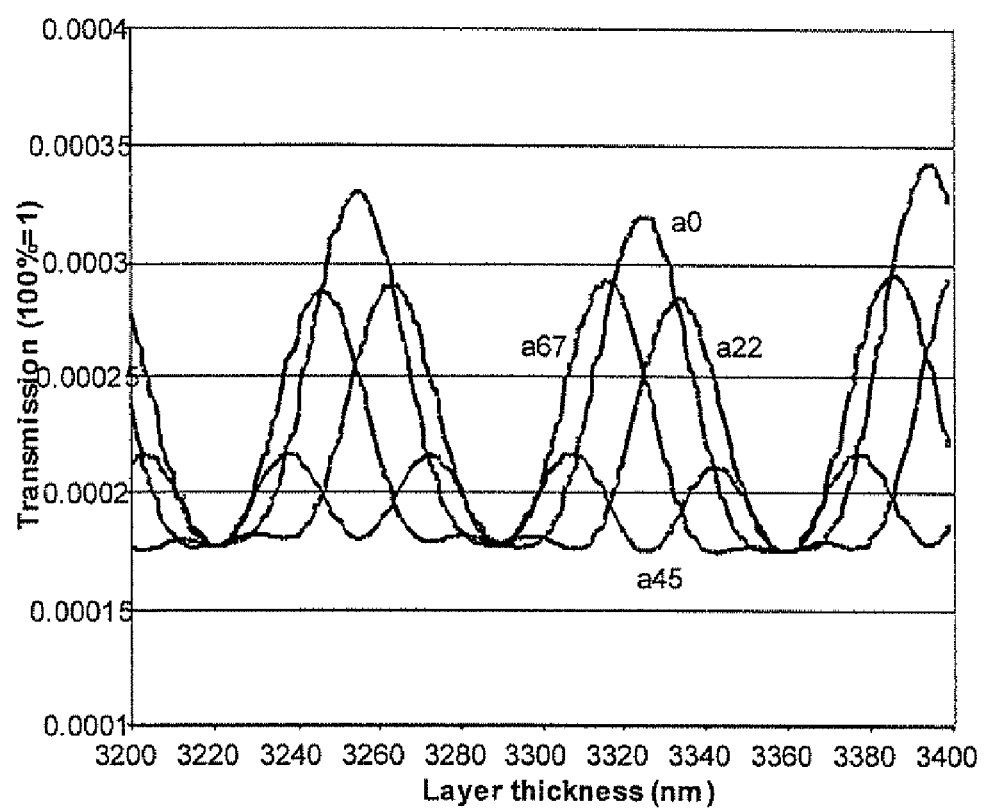
FIG. 5 shows the transmission of a UV-CLC film of the present invention between crossed polarisers with varied film thickness for different director orientations at the upper surface

The combination of reduced pitch and optimum orientation of the sample is shown in FIG. 5 for UV-CLC film (a) according to the present invention with a pitch of 140 nm, wherein the director at the lower surface is oriented at an angle of 0° (a0), 22° (a22), 45° (a45) and 67° (a67) relative to the lower polariser.

The invention claimed is:

1. A combination comprising
   (1) a negative birefringent retardation film comprising polymerized liquid crystal (LC) material with helically twisted structure and planar orientation, wherein the director of the liquid crystal material is parallel to the film plane and the helical pitch of the LC material is 200 nm or less, and
   (2) a linear polarizer,
   wherein the director at the surface of said retardation film facing said polarizer and the polarization direction of said polarizer are oriented at an angle of 30 to 60° relative to each other.

2. A combination according to claim 1, wherein said angle is 45°.

3. An electrooptical display or liquid display comprising a combination according to claim 1.

4. A compensator comprising a combination according to claim 1.

5. A liquid crystal display comprising a combination according to claim 1.

6. A liquid crystal display according to claim 5, which is a display of the VA (vertically aligned), MVA (multi-domain vertically aligned), PVA (patterned vertically aligned), ECB (electrically controlled birefringence), TN (twisted nematic), HTN (highly twisted nematic) or STN (super twisted nematic) mode.

7. A combination comprising
   (1) a negative birefringent retardation film comprising polymerized liquid crystal (LC) material with helically twisted structure and planar orientation, wherein the director of the liquid crystal material is substantially parallel to the film plane and the helical pitch of the LC material is 200 nm or less, and
   (2) a linear polarizer,
   wherein the director at the surface of said retardation film facing said polarizer and the polarization direction of said polarizer are oriented at an angle of 30 to 60° relative to each other.

8. A combination according to claim 7, wherein said angle is 45°.

9. An electrooptical display or liquid display comprising a combination according to claim 7.

10. A compensator comprising a combination according to claim 7.

11. A liquid crystal display comprising a combination according to claim 7.

12. A liquid crystal display according to claim 11, which is a display of the VA (vertically aligned), MVA (multi-domain vertically aligned), PVA (patterned vertically aligned), ECB (electrically controlled birefringence), TN (twisted nematic), HTN (highly twisted nematic) or STN (super twisted nematic) mode.

* * * * *